Feb. 15, 1938. P. H. STANLEY 2,108,417
AIR ROTOR PARTICULARLY FOR AIRCRAFT
Filed Aug. 18, 1934 2 Sheets-Sheet 1

INVENTOR.
Paul H. Stanley
BY
Synnestvedt & Lechner
ATTORNEYS

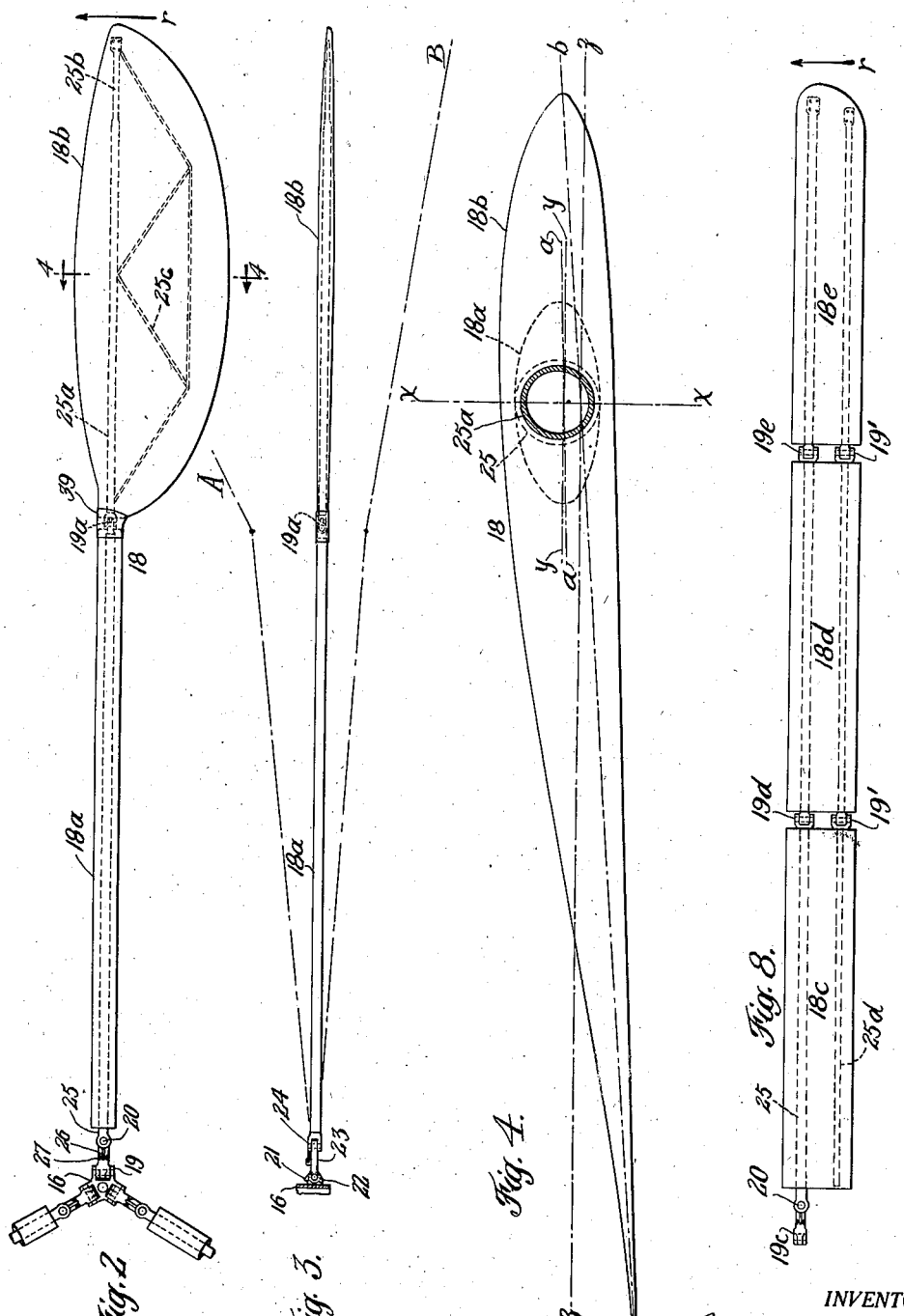

Patented Feb. 15, 1938

2,108,417

UNITED STATES PATENT OFFICE 2,108,417

AIR ROTOR PARTICULARLY FOR AIRCRAFT

Paul H. Stanley, Glenside, Pa., assignor to Autogiro Company of America, Willow Grove, Pa., a corporation of Delaware Application August 18, 1934, Serial No. 740,463

16 Claims. (Cl. 244—18)

This invention relates to air rotors, particularly for aircraft, and is especially concerned with autorotative sustaining wing systems, and to the construction, mounting, operation, and maintenance of the wings or blades thereof.

One of the primary objects of the invention is the attainment of a substantial increase in the efficiency of the individual wings, and of the rotor as a whole, in any rotative-winged machine, and more particularly in a machine having auto-rotative or aerodynamically-actuated sustaining wings, and still more specifically of the oscillatively-pivoted wing type.

Another fundamental purpose of the invention is to minimize or eliminate various vibrations or undesired oscillations, some of the effects of which, with certain rotors heretofore in use, have been evidenced by a "bouncing" or slight up-and-down vibration of the body of the aircraft at a rate (in vibrations per minute) which apparently bears a direct relationship to the speed of the rotor in R. P. M. Such bouncing is not to be confused with certain heretofore known blade vibrations occurring in the plane of rotation (which have been substantially minimized by certain devices such as improvements in rotor blade construction, pivotal articulations at the rotor hub, and damping devices, etc.), as it apparently occurs in a direction substantially axially of the rotor hub, that is, perpendicular to the plane of rotation, and is a result of certain characteristics of flight operation which will be considered in more detail hereinafter.

Other important objects of the invention involve the simplification and reduction in the cost of manufacturing rotor blades; the provision for ready replacement of damaged or broken blade parts by making the blade of a plurality of sections which are readily detachable, as by pivot joints, which joints at the same time serve a functional purpose in flight; minimizing somewhat the range of blade flapping necessary in the portion nearest to the axis of rotation, whereby greater blade clearance over the aircraft propeller may be obtained, or alternatively the mounting of the rotor may be lowered slightly to aid in lowering the center of gravity of the craft as a whole; and the lessening of risks incident to possible formation of ice on the rotor blades.

The invention further contemplates the accomplishment of the foregoing purposes in an extremely simple manner, by a concentration of blade area adjacent the tip of the blade and specifically by an improved plan formation; by sectionalizing or hinging the blade by inserting a pivot at an intermediate point thereof; by combinations of the foregoing; and by certain other features of improvement.

How the foregoing objects and advantages, together with others which may be incident to the invention or may occur to those skilled in the art, are attained, will appear more clearly from the following description, taken together with the accompanying drawings, in which drawings—

Figure 2 is a top plan view of a modified form of rotor for such an aircraft, with only one of the three blades shown in full; this form being the present preferred embodiment of the invention, in which the plan formation of the blade or wing is the same as that of Fig. 1 but in which the wing itself incorporates a hinge-jointed construction;

Figure 3 is a trailing edge elevational view of the blade or wing shown in Figure 2;

Figure 4 is a section taken on the line 4—4 of Figure 2, drawn on a substantially larger scale, and showing (only in outline) the sectional profiles or contours of the two major parts of the rotor blade, and illustrating further the normal incidence settings of said two portions with relation to each other and to a plane perpendicular to the axis of the rotor;

Figure 8 is a plan view similar to Figure 2 but illustrating a third embodiment of certain features of the invention.

Figure 1:
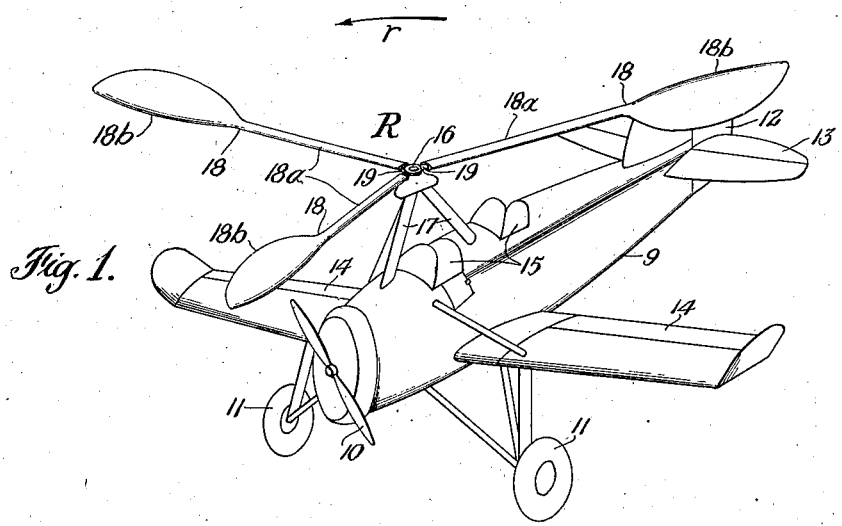
Figure 1 is a perspective view of an aircraft having a rotative wing system, embodying, in one form, certain features of the present invention.

Referring now to Figure 1, it will be seen that I have illustrated an aircraft having a body or fuselage 9, means of propulsion including an air screw 10, alighting mechanism 11, control surfaces including rudder 12, elevator 13, and ailerons 14, and a couple of cockpits 15.

The craft is sustained by means of a rotary wing system, indicated generally by the reference character R, which rotates in the direction of the arrow r about an upright axis provided by any suitable hub member 16 which is mounted above the body 9 as by means of pylon legs 17. The hub or axis member 16 is preferably mounted to be normally freely rotatable; and each wing 18 of the rotor has, at its root end, a pivotal mounting 19 on the hub 16, providing for variation in aerodynamic angle of attack of the wing or blade, as, for example, by freedom for some flapping motion transversely of the plane of rotation, as the rotor turns. The rotor R is preferably of the autorotative type, in which the wings or blades 18 are mounted on their axis at incidences within the autorotational range (that is, not more than about 6 or 8 degrees positive lift incidence, measured from a plane perpendicular to the rotor axis to the "no-lift" line of the particular wing section employed), such a rotor normally turning freely, in flight, under the influence of the relative flight wind, whether the machine is progressing forwardly under the influence of the propulsion means or whether it is descending vertically without power.
As before mentioned, one of the fundamental features of the invention is the obtaining of smooth rotor operation and the minimization of bumpiness or bouncing, while at the same time increasing the efficiency of the rotor; and such objects, among others, are attained by the embodiment shown in Figure 1 by concentrating the effective lift of the wing in the outer region thereof, and relatively reducing, if not eliminating, the effective lift of the inner portion of the wing.
More specifically, the effective area of the tip portion is very substantially increased as compared with the root or inner portion; and this is accomplished by making the wing of substantially paddle formation, i. e. with a shank portion 18a extending from the root outward to about half or more of the distance to the tip, and a blade portion proper 18b constituting the outer half or less of the total blade length. The shank may even be formed simply as a connecting member on which to mount the blade proper 18b. I have found, however, that, for very high average efficiency over the whole range of flight conditions from high speed forward flight to vertical descent, the following general proportions are advantageous (although they are given by way of example only, and not by way of limitation):

The shank portion 18a preferably extends 57% of the radius from the axis of the rotor outwardly, and this portion should be of the smallest feasible chord and preferably of counterpart double-ended (blunt-nosed) bi-convex section, of somewhat greater camber above the chord-line than below and of high thickness ratio, for example, 42%; and is set on the hub at about 6½° positive-lift incidence relative to a plane perpendicular to the hub axis. The outer panel or blade portion 18b may be of substantially true elliptical plan formation, occupying the outer 43% of the radius, may have a maximum chord of around 5 to 6 times that of the shank, and is preferably of a thin section (for example, an N. A. C. A. 23 with a thickness ratio of 9%); and is set at about 5° positive-lift incidence relative to a plane perpendicular to the hub axis. The two portions are merged or faired smoothly into one another.

The outer portion, so formed, gives a very great lifting effect, with low drag; a very substantial portion of the entire blade surface being located in the region of highest rotational speed.
The inner or shank portion, so formed, gives a small lifting effect, but has its drag reduced to a minimum not only when moving forwardly in its circle of rotation (at which time it is giving some lift over its full length) but also when moving rearwardly (at which time at least a portion of it is in a "stalled" condition with relation to the relative air-flow); and this extremely narrow double-nosed shank portion further greatly minimizes the disadvantage present in heretofore known blades in which the wide-chord root end, when the blade was in its forward quarter of rotation, produced chiefly a parasite drag by presenting a so-called "flat-plate area" inclined upwardly and forwardly against the line of flight, due to the normally coned position of the blade on its pivot.

Not only does the improved rotor blade of approximately the above described formation result in a large increase in rotor efficiency (approximately a 25% increase over blades heretofore employed), but it also has a marked effect in reducing or eliminating bouncing, which will now be discussed further:

While all of the factors which may have an influence upon bouncing are probably not known at this time, it seems apparent that one important factor is the substantial variation in pressure distribution along the length of the blade in every cycle of rotation, and the substantial movements of the center of pressure longitudinally in and out along the blade in every cycle of rotation. Such variations may, in turn, be due to a number of causes, but the major periodic cause is the difference in speed of the blade relative to the air when it is advancing forwardly in the direction of flight as compared with when it is rotating rearwardly. This differential (measured in percentage of net air-speed of the blade) is smaller at the region of the blade toward the tip than it is at the region toward the root, since the ratio which the tip speed of rotation bears to the forward speed of the craft is much greater than the ratio between the speed of any point on the blade near the root and the same forward speed of the craft.

Thus, in a rotor blade having a tip speed of rotation of 300 m. p. h. (on a machine travelling at 100 m. p. h.) the tip portion will have a net relative air speed of 400 m. p. h. at the instant when the blade is at right angles to the line of flight and is moving forward in its circle of rotation, and will have a net relative air speed of 200 m. p. h. when diametrically opposite that position: a speed differential of 50%. It will readily be seen that some given point in the inner region of that same blade will have a rotational speed of 100 m. p. h., and that its net relative air speeds (in the two positions just described) will be 200 m. p. h. and 0 m. p. h.: a speed differential of 100%. Still closer to the root the blade, when on the retreating side, will actually experience a reverse air-flow, at which time the double blunt-nosed section serves to give the least possible drag. It will be understood that the pivoting of the blades at the root, providing for variation in their aerodynamic angle of attack, substantially equalizes the lift of the several blades, or, stated in another way, it renders substantially uniform the total lift of a blade in all its angular positions around its axis of rotation; but such pivoting does not eliminate variations in the pressure distribution along the blade or the inward and outward travel of the center of pressure. Therefore, bending moments occur, within the blade itself, in a direction transverse the general plane of rotation, which are not relieved by the root pivots; and with certain rotor blades heretofore in use a resultant vibration or bouncing has been transmitted to the hub and thus to the machine, the detrimental effects of which have been particularly apparent in three-bladed rotors, wherein there are no two blades acting directly opposite to each other and in a directly opposing manner. Since, from other standpoints the three-bladed rotor has marked advantages peculiar to itself, the present invention is of substantial benefit by virtue of its improvement of the operation of three-bladed rotors, although it is also beneficial in rotors generally.

From the foregoing more or less theoretical discussion it will now be evident that the blade formation of the present invention, as illustrated in Figure 1, very largely obviates the bouncing effects by concentrating the blade area in a restricted zone, adjacent the tip, whereby the variations in pressure distribution and in longitudinal location of the center of pressure are substantially minimized.

Another advantage of the contour and plan formation of the rotor blade of Figure 1 is the possible reduction in the detrimental effects of ice formation on the blade. It has been found by experience that when atmospheric conditions are such as to produce an ice formation, the accumulation of ice is much greater on the inner or shank portion of the blade than the outer portion, and it is well known that the formation of ice not only adds weight but by modifying the external contour of the wing it reduces the lift-drag ratio. This detrimental result is of less consequence where the shank of the blade is made a smaller factor and the outer panel a larger factor in the total lift to be obtained from the blade as a whole.

Turning now to the construction illustrated in Figures 2 to 7 inclusive, it will be seen that this involves substantially the same plan form, profiles, pitch settings, and the like, as just described with reference to the construction illustrated in Figure 1; but with the addition of certain other features, hereinafter to be described.

As seen in plan in Figure 2, the hub member 16 is the same as the hub employed in the machine of Figure 1, as are also the inner and outer wing members, namely, the shank 18a and the paddle or blade portion 18b. While any suitable root pivoting arrangement, designed to effect variation in aerodynamic angle of attack, may be employed, I prefer to utilize a pair of pivot axes 19 and 20; the pivot 19 providing for variation in aerodynamic angle of attack, by permitting free flapping of the blade about an axis which intersects the blade axis and lies substantially in a plane perpendicular to the rotor axis; and the pivot 20 providing for swinging movements generally fore and aft in the path of rotation to accommodate drag and acceleration forces and eliminate resonant vibrations and the like, the latter pivot being positioned radially outwardly beyond the pivot 19 and being located to intersect the longitudinal blade axis and to lie substantially in a plane containing the rotor axis. Upward limiting stops and droop stops 21 and 22 are provided on the extension link 23, in positions to react against the hub 16. One of the pivot forks 24 of the tubular blade spar 25 is provided with a tongue 26, which is so positioned that when the blade moves a few degrees in either direction from a radial position, about the pivot 20, the tongue will engage one or the other of the limiting stops 27.

The wing itself, in this embodiment of the invention, is of a divided construction, that is, the shank 18a and the outer panel 18b are separate members, joined by a pivot pin 19a, the axis of which lies in the plane of the blade and intersects the longitudinal axis thereof. The axis of the pivot 19a is thus preferably parallel with the axis of the pivot 19. Considered in another way, the most effective blade surface has a multi-pivoted connection with the hub or axis member, being pivoted at a point closely adjacent the rotor axis by means of the pivot 19 and at a point at least half the distance outwardly toward the tip of the wing by means of the pivot 19a; there being also preferably provided an intermediate pivot 20 the axis of which intersects the plane common to the pivots 19 and 19a. It will be noted from Figure 2 that the gap between the adjacent ends of the inboard and outboard panels 18a and 18b is preferably covered by a thin rubber or other elastic strip or sleeve 39, which may be cemented or otherwise fastened in place to smoothly fair together the two wing sections and to enclose the pivot 19a.

From an aerodynamic standpoint, the pivot 19a sectionalizes the wing and thus also the wing pivoting movements; and its action tends toward results similar to those flowing from the wing formation itself (as above described with reference to Figure 1), and notably contributes to the elimination of bouncing.

From a structural standpoint, such an outboard hinge, or secondary horizontal pivot, has also been found to have decided advantages. For instance, it makes it readily possible to employ a large diameter spar member 25 (for example, of 2-inch outside diameter) in the inner portion of the wing which must carry the heavier centrifugal loads; and to employ a smaller diameter spar member 25a in the outer panel, which is desirable not only because the outer portion of the spar has less of a centrifugal load to carry but also because the total weight per unit of length can thereby be more nearly equalized in the narrow and wide-chord portions of the wing. In fact, I am enabled to add to the load-carrying spar 25a in the outer panel a small truss 25c of thin metallic tubing to stiffen the same as well as to provide better support for the usual wing-ribs (not shown), and still keep the weight of such metallic structure, per unit of length, below the weight of a similar length of the spar member 25.

In other words, since the contour-defining structure (ribs, covering, etc.) of the outer panel 18b, which is of very wide chord, naturally embodies more weight per unit of length than the contour-defining structure of the inner shank 18a, which is of extremely narrow chord, the spar member 25a with its bracing should be of proportionately less weight per unit of length than the spar member 25, in order to obtain substantially uniform weight distribution throughout the length of the wing; and this desirable object can most conveniently be attained by making the two spar members separate and hinging them at the juncture of the wing portions 18a and 18b. If desired, the member 25a may, at the narrowing chord portion adjacent the tip of the blade, be formed to a still smaller diameter, as at 25b, but preferably of somewhat increased wall thickness.

Another structural advantage resulting from the employment of an outboard pivot resides in the facility with which the contour of the blade may be built up around the inboard and outboard spar members. For instance, the narrow shank portion is well adapted to utilization of its spar 25 as a core and to a filling-in of the profile with balsa wood, or the like, covered on the outside with any suitable fabric, after the manner of the construction in Patent 1,969,781, issued to Juan de la Cierva, August 14, 1934; whereas it may be more convenient or desirable to build up the contour-defining surface of the outboard panel by means of ribs supported on the spar 25a and truss 25c and covered with ply wood and/or fabric, after the manner of the construction in Patent 1,905,411, issued to Agnew E. Larsen on March 13, 1934. Any other known types of rotary wing construction details may be utilized to form the wing contour here shown.

Still another structural advantage is the convenience with which the inner and outer portions of the blade may be mounted at different effective incidences. This is well illustrated in Figure 4, which shows in full outline and in section, respectively, the profile and the spar member 25a of the outer panel 18b (at its maximum chord), and in dotted lines the profile and spar 25 of the shank 18a.

The lines y—y and z—z represent planes perpendicular to the rotor axis x—x. It will be noted that the chord line a—a of the wing section 18a is set at an angle of +1½° to the plane y—y, but since the particular aerofoil section illustrated has a theoretical "no-lift" line at —5° to the chord line, it will be evident that this setting of the chord at +1½° results in a positive lift incidence of +6½° relative to a plane perpendicular to the rotor axis x—x. It will also be noted that chord line b—b of the wing section 18b is set at an angle of +4° to the plane z—z, but since the particular aerofoil section illustrated has a theoretical "no-lift" line at —1° to the chord line, it will be evident that this setting of the chord at +4° results in a positive lift incidence of +5° relative to a plane perpendicular to the rotor axis x—x. While two planes y—y and z—z are shown, this is merely for the sake of convenience in relating them to the chord lines a—a and b—b.

It might here be mentioned that it has heretofore been customary, in autorotative rotors, to set the outer portion of the blade at a greater positive lift incidence than the inner portion, but by virtue of the present invention, in which the area of the inner portion is substantially reduced as compared with prior practice, I am enabled to set the inner portion at a higher positive lift incidence than the outer portion, so as to still obtain some useful lift from the inner portion while at the same time reducing the drag of the inner portion to a minimum.

Figure 5:
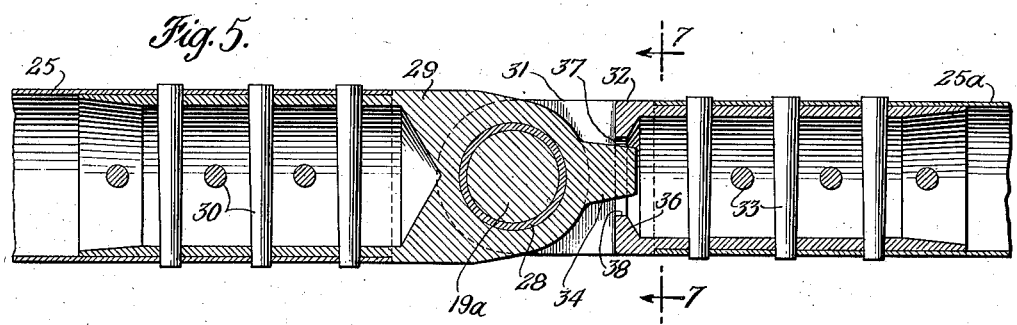
Figure 5 is an enlarged longitudinal section, taken on a vertical plane through the hinge joint connecting the inner and outer main portions of the rotor blade of Figure 2 (the view being taken on the line 5—5 of Figure 6)
Figure 6:
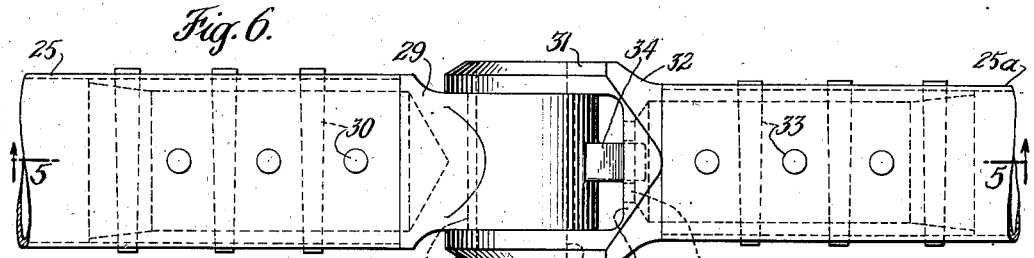
Figure 6 is a plan view of the structure of Figure 5.
Figure 7:
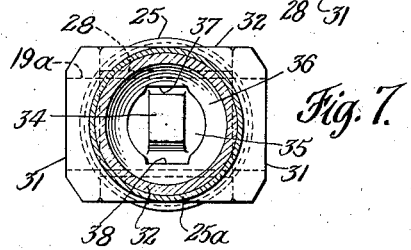
Figure 7 is a sectional view on the line 7—7 of Figure 5.

Other structural advantages resulting from or associated with the pivot 19a will appear from a description of the details of the pivot joint, as illustrated in Figures 5 to 7 inclusive. From those figures it will be seen that the pivot 19a is carried by a bearing sleeve or bushing 28 which is mounted in a horizontal transverse aperture in the fitting member 29, which latter is secured in the outer end of the inboard spar member 25 as by means of pins 30. The ends of the pivot pin 19a are fitted in apertures in the fork-ends 31 of a fitting 32 which is secured in the inner end of the outer spar member 25a as by means of pins 33.

Limitation of the relative angling between the inboard and outboard wing members is provided by means of a tongue or abutment 34, integral with the fitting 29, which fits into an aperture 35 formed in the inturned flange 36 of the fitting 32; the tongue being adapted to contact alternatively with the surfaces 37 and 38. It will be observed from Figure 5 that when the two spar members are in alignment, there is a greater gap or clearance between the tongue 34 and the abutment surface 38 than there is between the tongue 34 and the abutment surface 37. The reason for this is that, in flight, the outer panel tends to take an average position which is slightly coned upwards with respect to the inner panel, so that the flight clearance range on each side of said average position is approximately equal.

The clearances should be sufficient to provide unimpeded relative angling between the inner and outer parts of the wing under all normal flight conditions. When the rotor is at rest, the stop 38 would normally come into play only if some wind gust should blow the outer panel upwardly; and the stop 37 normally serves as a droop support for the outer panel. For these purposes, the clearance adjacent the stop 38 (Fig. 5) may be made such as to permit approximately a 10° upward angling of the outboard blade member relative to the inboard blade member, and the clearance adjacent the stop 37 may be made such as to permit approximately a 5° downward angling of the outboard blade member relative to the inboard blade member.

By reference now to Figure 3, it will be seen that similar differences in clearance are provided for the root-end stops 21 and 22 which limit the movements of the wing about the inboard pivot 19. The upward coning stop 21 may be given a clearance of 10° or more and the droop support 22 may be given a clearance of about 4°.

Thus, by sectionalizing the wing, and providing a plurality of flapping pivots (19, 19a) I am enabled to apportion part of the coning movement to one of said pivots and part of it to the other, so that the clearances for the limiting stops, particularly in the drooping direction, need not be as great as has heretofore been necessary where the blade was pivoted only at the root. One of the advantages of this is that the inboard portion of the blade (which extends outwardly beyond the propeller 10) need not be provided with such a large negative coning range as was heretofore required, and the rotor may therefore be mounted slightly lower, resulting in lowering the center of gravity of the craft without any less clearance over the propeller. Similarly, the upward coning range provided at the root need not be as great as heretofore, since the outer portion of the blade (giving the greater portion of the lift) may itself cone upwardly, under flight load, relative to the inboard portion; thus also relieving bending stresses in the spar, when under load. These actions are diagrammatically illustrated by the dot and dash lines A and B, in Figure 3.

Turning now to the third embodiment of the invention, illustrated in Figure 8, it will be seen that I have utilized a blade of substantially rectangular plan form (with slightly rounded tip portion) of known construction. This wing, when hinged only at the root, was of rough operation, particularly when the machine was flown above a given speed, or when the wing was used on a three-bladed rotor. Tests have shown that the roughness disappeared when the blade was divided into a plurality of sections, such as 18c, 18d, and 18e, mounted and interconnected, respectively, by the pivots 19c, 19d and 19e.

In a blade of this character, that is, of substantially uniform chord throughout the major part of its length, it may be preferable to employ a secondary spar 25d paralleling the main spar (the main spar, only, being pivoted on the hub), and in such event I insert supplemental pivots 19' to interconnect the sections of the secondary spar.

In the construction of Figure 8, as in that of Figure 2, the most effective lifting surface (the outermost panel 18e) is hinge mounted, and flight tests show that one such hinge (as at 19e) produces a marked improvement in smoothing out the rotor operation; but it is additionally advantageous to employ a series of pivots, as shown in Figure 8, where a large effective lifting surface is provided along substantially the entire length of the wing. This also appears to break up resonant vibration effects in the spar, by sectionalizing the same.

In any arrangement employing one or more outboard pivots, it will be understood that such pivots not only provide for the relative angling of the several divisions of the wing, in the flapping direction, but also serve to fixedly position the sections longitudinally, and by their rigid connection to the spar sections or other main longitudinal stress carrying members, serve to maintain any given relative incidence settings between the inner and outer sections of the wing.

Among other structural advantages of an outboard pivot arrangement may be mentioned: the reduction in maintenance and repair of rotors, since a damaged wing tip or other section may be repaired by substituting a new section; and the possibility of varying the rotor diameter and other rotor characteristics, by adding or removing a section of any desired formation or by substituting a section or member of different length, chord, pitch, and the like.

In conclusion, it may be stated that increased efficiency and smoother rotor operation (including the minimization of bouncing), reduction in bending and thus fatigue of the spars, and other advantages both aerodynamic and structural, are attained by either the special wing formation of Figure 1 or the multiple hinging arrangement of Figure 8; and that both these arrangements (as combined in the structure of Figures 2 to 7) have a cooperative action in attaining similar results. However, the combined arrangement, which is the preferred embodiment of the invention, has special advantages, since the outboard pivot joins sections which are of radically differing nature both from the structural and operational standpoint.

While the invention has herein been illustrated as applied to a machine having usual control surfaces, it should be understood that it is equally applicable and actually even more advantageous in a machine in which the control (as well as the sustension) is placed in the rotor itself, for instance a machine with a manually-tiltable rotor hub as exemplified in application of Juan de la Cierva, Serial No. 645,985, filed December 6th, 1932 (corresponding to British Patent 393,976). Flight tests of my invention applied to such a machine show a marked reduction in the vibration transmitted from the rotor to the control stick.

Attention is called to the fact that certain features of a rotor wing having an intra-wing hinge are described and claimed in application Serial No. 102,570, filed September 25, 1936, of Ralph H. Upson, for Reissue of Patent No. 2,021,470, assigned to the Assignee of this application.

I claim:—

1. An air rotor including an axis member, an aeroform wing member, and means of connection between said members including a plurality of wing pivots, one pivot having its axis lying substantially in a plane containing the rotor axis and another pivot having its axis extending substantially transversely of said plane and located at a point from said rotor axis approximately half the distance from said rotor axis to the extremity of said wing member.

2. An air rotor including an axis member, an aeroform wing member, and means of connection between said members including a plurality of wing pivots, two such pivots having their axes substantially paralleling each other, and a third pivot having its axis in a plane approximately at right angles to the common plane of the said two pivots, said two pivots being spaced-apart about one-half the radius of the rotor and said third pivot being located between them.

3. An air rotor including an axis member, an aeroform wing member, and means of connection between said members including a plurality of wing pivots, two such pivots having their axes substantially paralleling each other in a plane which is approximately perpendicular to the rotor axis and being spaced-apart about one-half the radius of the rotor, and a third pivot having its axis substantially in a plane containing the rotor axis and being located intermediate said two pivots.

4. An air rotor including an axis member, an aeroform wing member, and means of connection between said members including a plurality of wing pivots, two such pivots having their axes substantially paralleling each other in a plane which is approximately perpendicular to the rotor axis and being spaced-apart about one-half the radius of the rotor, and a third pivot having its axis substantially in a plane containing the rotor axis and being located intermediate said two pivots and closer to the inner of them.

5. An aeroform rotary wing capable of autorotational actuation, comprising a root or inner portion of substantially uniform narrow-chord double blunt-nosed section, and an outer portion of substantially greater average chord and approximately elliptical plan form, and a pivot joint near the juncture of said portions.

6. An aeroform rotary wing capable of autorotational actuation, comprising a narrow-chord inboard portion of substantially symmetrical double blunt-nosed section and high thickness-ratio and an outboard portion of greater average chord and smaller thickness-ratio having its major area lying behind the central longitudinal axis of the inboard portion and being set at a lower positive-lift incidence than said inboard portion.

7. An aeroform rotary wing capable of autorotational actuation, comprising a narrow-chord inboard portion of high thickness-ratio and an outboard portion of greater average chord and smaller thickness-ratio and set at a lower positive-lift incidence than the inboard portion, and a pivot joint near the juncture of said portions.

8. A rotary wing of varying chord being narrow in the root region and wider in an outer region, but of approximately constant weight per unit of length.

9. For aircraft, a rotary wing of cambered section and elongated plan form including a main longitudinally extending centrifugal load carrying member formed in sections, and joint means interconnecting the sections and providing freedom for relative angling of said sections in a direction transverse the general plane of the wing, said main member having a pivot mounting at the root end adapted to mount the wing on its rotational axis, and supplemental longitudinally extending wing strengthening means having joint means aligned, transversely of the wing, with the joint means first mentioned.

10. An air rotor comprising an upright axis member, a rotary wing including inboard and outboard sections of considerable inherent stiffness, means pivoting the inboard section adjacent its root, upon said axis member, for up and down swinging movements, means limiting the downward swinging movement of said inboard member about its pivot, and means pivoting the outboard member with respect to the inboard member for up and down flapping of said outboard member relative to the inboard member, and means limiting the downward flapping of said outboard member.

11. An aircraft sustaining rotor construction including an upright axis member, an elongated rotary wing divided into sections connected end-to-end, pivot means interconnecting said sections for relative angling in a plane generally perpendicular to the plane of the wing and pivot means mounting the inboard section on the axis member for up and down swinging, and means limiting said angling and swinging in a downward direction from a true radial position to a range smaller than the upper range.

12. In a rotor blade, an inner blade panel and an outer blade panel, a pivot interconnecting said panels for relative angling and having its axis lying substantially in the plane of the blade and intersecting the longitudinal axis thereof, and co-operating angle-limiting stops in the adjacent panel ends.

13. In a rotor blade, an inner blade panel and an outer blade panel, a pivot interconnecting said panels for relative angling and having its axis lying substantially in the plane of the blade and intersecting the longitudinal axis thereof, and co-operating angle-limiting stops in the adjacent panel ends constructed with greater clearance for relative angling in an upward direction than in a downward direction.

14. A rotary wing which includes a relatively narrow-chord elongated inboard portion of aeroform cross-section embodying a main longitudinally-extending centrifugal load carrying member, and a relatively wider-chord outboard panel of aeroform cross-section which in plan form progressively narrows toward its inner and outer ends and embodying a longitudinally-extending member of a lesser cross-sectional dimension or weight than the first-mentioned member and diagonal or truss-like bracing secured thereto and lying within the contours of said panel.

15. In an aircraft sustaining rotor, an aeroform autorotative wing comprising: a narrow-chord inboard shank portion of substantially symmetrical double blunt-nosed section and high thickness-ratio, and an outboard blade portion approximating two-fifths the length of the blade and of lower thickness-ratio with a maximum chord at least five time that of said shank portion and having its major area positioned rearward of the central longitudinal vertical plane of said shank portion.

16. A multi-winged air rotor including an axis member, an aeroform wing member, and means of connection between said members including a plurality of pivots each providing for movements of said wing member automatically under the influence of the flight forces thereon in both directions from the mean or average pivotal position independently of other wings of the rotor, two such pivots having their axes substantially paralleling each other in a plane which is approximately perpendicular to the rotor axis and being spaced-apart about one-half the radius of the rotor, and a third pivot having its axis substantially in a plane containing the rotor axis.

PAUL H. STANLEY.